United States Patent
Matsumoto et al.

(10) Patent No.: US 10,460,754 B2
(45) Date of Patent: Oct. 29, 2019

(54) SLIDER AND SUSPENSION ARM INTERCONNECTION FOR MAGNETIC STORAGE DEVICE

(71) Applicant: Western Digital Technologies, Inc., Irvine, CA (US)

(72) Inventors: Yuhsuke Matsumoto, Fujisawa (JP); Kenichi Murata, Ebina (JP); Adisak Tokaew, Muang (TH); David Druist, San Jose, CA (US); Glenn Gee, San Jose, CA (US); Mark Moravec, Lamlukka (TH); Michael Ranes, Looc Calamba (PH); Peter Paolo Dilla, Santa Rosa (PH)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 0 days.

(21) Appl. No.: 15/888,449

(22) Filed: Feb. 5, 2018

(65) Prior Publication Data
US 2019/0244636 A1    Aug. 8, 2019

(51) Int. Cl.
*G11B 5/48* (2006.01)

(52) U.S. Cl.
CPC ....... *G11B 5/4853* (2013.01); *Y10T 29/49027* (2015.01)

(58) Field of Classification Search
None
See application file for complete search history.

(56) References Cited

U.S. PATENT DOCUMENTS

| | | | |
|---|---|---|---|
| 5,821,494 A | 10/1998 | Albrecht et al. | |
| 5,828,031 A * | 10/1998 | Pattanaik | H05K 3/3442 360/234.5 |
| 6,002,550 A * | 12/1999 | Amemiya | G11B 5/4853 360/234.5 |
| 6,046,882 A * | 4/2000 | Pattanaik | H05K 3/3442 360/234.5 |
| 6,188,546 B1 * | 2/2001 | Nakajima | G11B 5/4853 360/234.5 |
| 6,239,952 B1 | 5/2001 | Bonin | |
| 8,259,415 B2 | 9/2012 | Hutchinson et al. | |
| 8,400,736 B2 | 3/2013 | Greninger et al. | |
| 8,477,457 B2 | 7/2013 | Matsumoto et al. | |
| 8,587,901 B1 | 11/2013 | Puttichaem et al. | |

(Continued)

*Primary Examiner* — Craig A. Renner
(74) *Attorney, Agent, or Firm* — Kunzler Bean & Adamson (57) ABSTRACT

Disclosed herein is a magnetic storage device that comprises a suspension arm co-movably fixed to a carriage arm. The suspension arm comprises a slider attachment side and at least one first electrical contact pad on the slider attachment side. The suspension arm also comprises a slider co-movably fixed to the suspension arm. The slider comprises a suspension attachment side, a non-head side facing the suspension arm and intersecting the suspension attachment side at a first slider edge of the slider, a head side facing away from the suspension arm, and at least one electrical contact component on the suspension attachment side up to the first slider edge. At least one solder weldment is directly coupled to the at least one first electrical contact pad and the at least one electrical contact component. Additionally, a read-write head is coupled to the head side of the slider.

8 Claims, 9 Drawing Sheets

(56) References Cited

U.S. PATENT DOCUMENTS

| | | |
|---|---|---|
| 9,728,211 B1 | 8/2017 | Murata et al. |
| 2007/0047144 A1* | 3/2007 | Oosawa .................. G11B 5/60 |
| | | 360/234.5 |

* cited by examiner

SLIDER AND SUSPENSION ARM INTERCONNECTION FOR MAGNETIC STORAGE DEVICE

FIELD

This disclosure relates generally to magnetic storage devices, and more particularly to improving the electrical connection between a slider and a suspension arm of a read-write head assembly.

BACKGROUND

Magnetic storage devices, such as hard disk drives ("HDDs"), are widely used to store digital data or electronic information for enterprise data processing systems, computer workstations, portable computing devices, digital audio players, digital video players, and the like. Generally, HDDs include read-write head assemblies that help facilitate storage of data on magnetic disks. Each read-write head assembly may include a slider, supporting a read-write head, and a suspension arm. Reliably electrically interconnecting the slider and the suspension arm of a read-write head assembly can be difficult.

SUMMARY

A need exists for a magnetic storage device that reliably electrically interconnects the slider and suspension arm of a read-write head assembly of the magnetic storage device. The subject matter of the present application has been developed in response to the present state of magnetic storage device are, and in particular, in response to problems and needs in the art, such as those discussed above, that have not yet been fully solved by currently available magnetic storage devices. Accordingly, the embodiments of the present disclosure overcome at least some of the shortcomings of the prior art.

Disclosed herein is a magnetic storage device that comprises a magnetic disk and a carriage arm rotatably movable relative to the magnetic disk. The magnetic storage device also comprises a suspension arm co-movably fixed to the carriage arm. The suspension arm comprises a slider attachment side and at least one first electrical contact pad on the slider attachment side. The suspension arm also comprises a slider co-movably fixed to the suspension arm. The slider comprises a suspension attachment side, a non-head side facing the suspension arm and intersecting the suspension attachment side at a first slider edge of the slider, a head side facing away from the suspension arm, and at least one electrical contact component on the suspension attachment side up to the first slider edge. The magnetic storage device further comprises at least one solder weldment directly coupled to the at least one first electrical contact pad and the at least one electrical contact component. The magnetic storage device additionally comprises a read-write head coupled to the head side of the slider. The preceding subject matter of this paragraph characterizes example 1 of the present disclosure.

The slider attachment side of the suspension arm, the non-head side of the slider, and the head side of the slider is parallel to the magnetic disk. The suspension attachment side of the slider is perpendicular to the magnetic disk. The preceding subject matter of this paragraph characterizes example 2 of the present disclosure, wherein example 2 also includes the subject matter according to example 1, above.

The at least one electrical contact component comprises a second electrical contact pad. The second electrical contact pad extends up to the first slider edge such that no gap exists between the second electrical contact pad and the first slider edge. The preceding subject matter of this paragraph characterizes example 3 of the present disclosure, wherein example 3 also includes the subject matter according to any one of examples 1 or 2, above.

The second electrical contact pad is narrower near the first slider edge than away from the first slider edge. The preceding subject matter of this paragraph characterizes example 4 of the present disclosure, wherein example 4 also includes the subject matter according to example 3, above.

The second electrical contact pad, at the first slider edge, comprises at least one slit. The preceding subject matter of this paragraph characterizes example 5 of the present disclosure, wherein example 5 also includes the subject matter according to example 3, above.

The second electrical contact pad, at the first slider edge, comprises a plurality of slits. The preceding subject matter of this paragraph characterizes example 6 of the present disclosure, wherein example 6 also includes the subject matter according to example 5, above.

The at least one electrical contact component comprises a second electrical contact pad and a metallic sheet. The metallic sheet overlays the second electrical contact pad. The preceding subject matter of this paragraph characterizes example 7 of the present disclosure, wherein example 7 also includes the subject matter according to example 1, above.

The at least one electrical contact component does not extend up to the first slider edge such that a gap exists between the second electrical contact pad and the first slider edge. The metallic sheet overlays a portion of the suspension attachment side up to the first slider edge and is interposed within the gap between the second electrical contact pad and the first slider edge. The preceding subject matter of this paragraph characterizes example 8 of the present disclosure, wherein example 8 also includes the subject matter according to example 7, above.

The suspension attachment side comprises a bevel feature or a step feature between the second electrical contact pad and the first slider edge. The metallic sheet overlays the bevel feature or the step feature. The preceding subject matter of this paragraph characterizes example 9 of the present disclosure, wherein example 9 also includes the subject matter according to example 8 above.

The metallic sheet at least partially overlays the non-head side of the slider. The preceding subject matter of this paragraph characterizes example 10 of the present disclosure, wherein example 10 also includes the subject matter according to any one of examples 7-9, above.

The metallic sheet is made of a metal with an ionization energy of at most 9,500 eV. The preceding subject matter of this paragraph characterizes example 11 of the present disclosure, wherein example 11 also includes the subject matter according to any one of examples 7-10, above.

The metallic sheet is thinner and more pliable than the second electrical contact pad. The preceding subject matter of this paragraph characterizes example 12 of the present disclosure, wherein example 12 also includes the subject matter according to any one of examples 7-11, above.

The metallic sheet and the second electrical contact pad are made of gold. The preceding subject matter of this paragraph characterizes example 13 of the present disclosure, wherein example 13 also includes the subject matter according to any one of examples 7-12, above.

The suspension arm comprises at least twelve first electrical pads. The slider comprises at least twelve electrical contact components. The magnetic storage device comprises at least twelve weldments each directly coupled to corresponding ones of the at least twelve first electrical pads and the at least twelve electrical contact components. The preceding subject matter of this paragraph characterizes example 14 of the present disclosure, wherein example 14 also includes the subject matter according to any one of examples 1-13, above.

Also disclosed herein is a read-write head assembly for a magnetic storage device. The read-write head assembly comprises a suspension arm and a slider co-movably fixed to the suspension arm. The suspension arm comprises a slider attachment side and at least one first electrical contact pad on the slider attachment side. The slider comprises a suspension attachment side, a non-head side facing the suspension arm and intersecting the suspension attachment side at a first slider edge of the slider, a head side facing away from the suspension arm, and at least one electrical contact component on the suspension attachment side up to the first slider edge. The read-write head assembly further comprises at least one solder weldment directly coupled to the at least one first electrical contact pad and the at least one electrical contact component. The read-write head assembly additionally comprises a read-write head coupled to the head side of the slider. The preceding subject matter of this paragraph characterizes example 15 of the present disclosure.

The at least one electrical contact component comprises a second electrical contact pad. The second electrical contact pad extends up to the first slider edge such that no gap exists between the second electrical contact pad and the first slider edge. The preceding subject matter of this paragraph characterizes example 16 of the present disclosure, wherein example 16 also includes the subject matter according to example 15, above.

The at least one electrical contact component comprises a second electrical contact pad and a metallic sheet. The metallic sheet overlays the second electrical contact pad. The preceding subject matter of this paragraph characterizes example 17 of the present disclosure, wherein example 17 also includes the subject matter according to example 15, above.

Additionally disclosed herein is a method of making a magnetic storage device. The method comprises coupling at least one first electrical contact pad to a slider attachment side of a suspension arm and coupling at least one electrical contact component to a suspension attachment side of a slider up to a first slider edge of the slider. The first slider edge is an intersection of the suspension attachment side and a non-head side of the slider facing the suspension arm. The method also comprises soldering the at least one first electrical contact pad of the suspension arm directly to the at least one electrical contact component of the slider. The method further comprises co-movably fixing the suspension arm to a carriage arm that is rotatably movable relative to a magnetic disk. The preceding subject matter of this paragraph characterizes example 18 of the present disclosure.

The at least one electrical contact component comprises a second electrical contact pad. Coupling the at least one electrical contact component comprises applying a strip of electrical material onto the suspension attachment side of the slider such that the strip of electrical material overhangs the first slider edge and trimming the strip of electrical material along the first slider edge. The method further comprises, prior to trimming the strip of electrical material, at least one of forming the strip of electrical material to have a narrower width at the first slider edge than away from the first slider edge or forming a plurality of slits in the strip of electrical material from the first slider edge along the suspension attachment side. The preceding subject matter of this paragraph characterizes example 19 of the present disclosure, wherein example 19 also includes the subject matter according to example 18, above.

Coupling the at least one electrical contact component comprises attaching a second electrical contact pad to the suspension attachment side of the slider such that a gap exists between the second electrical contact pad and the first slider edge, and overlaying the gap, between the second electrical contact pad and the first slider edge, and at least a portion of the second electrical contact pad with a metallic sheet. The preceding subject matter of this paragraph characterizes example 20 of the present disclosure, wherein example 20 also includes the subject matter according to example 18, above.

The described features, structures, advantages, and/or characteristics of the subject matter of the present disclosure may be combined in any suitable manner in one or more embodiments and/or implementations. In the following description, numerous specific details are provided to impart a thorough understanding of embodiments of the subject matter of the present disclosure. One skilled in the relevant art will recognize that the subject matter of the present disclosure may be practiced without one or more of the specific features, details, components, materials, and/or methods of a particular embodiment or implementation. In other instances, additional features and advantages may be recognized in certain embodiments and/or implementations that may not be present in all embodiments or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims, or may be learned by the practice of the subject matter as set forth hereinafter.

BRIEF DESCRIPTION OF THE DRAWINGS

In order that the advantages of the disclosure will be readily understood, a more particular description of the disclosure briefly described above will be rendered by reference to specific embodiments that are illustrated in the appended drawings. Understanding that these drawings depict only typical embodiments of the disclosure and are not therefore to be considered to be limiting of its scope, the subject matter of the present application will be described and explained with additional specificity and detail through the use of the accompanying drawings, in which.

DETAILED DESCRIPTION

Reference throughout this specification to "one embodiment," "an embodiment," or similar language means that a particular feature, structure, or characteristic described in connection with the embodiment is included in at least one embodiment of the present disclosure. Appearances of the phrases "in one embodiment," "in an embodiment," and similar language throughout this specification may, but do not necessarily, all refer to the same embodiment. Similarly, the use of the term "implementation" means an implementation having a particular feature, structure, or characteristic described in connection with one or more embodiments of the present disclosure, however, absent an express correlation to indicate otherwise, an implementation may be associated with one or more embodiments.

Figure 1:
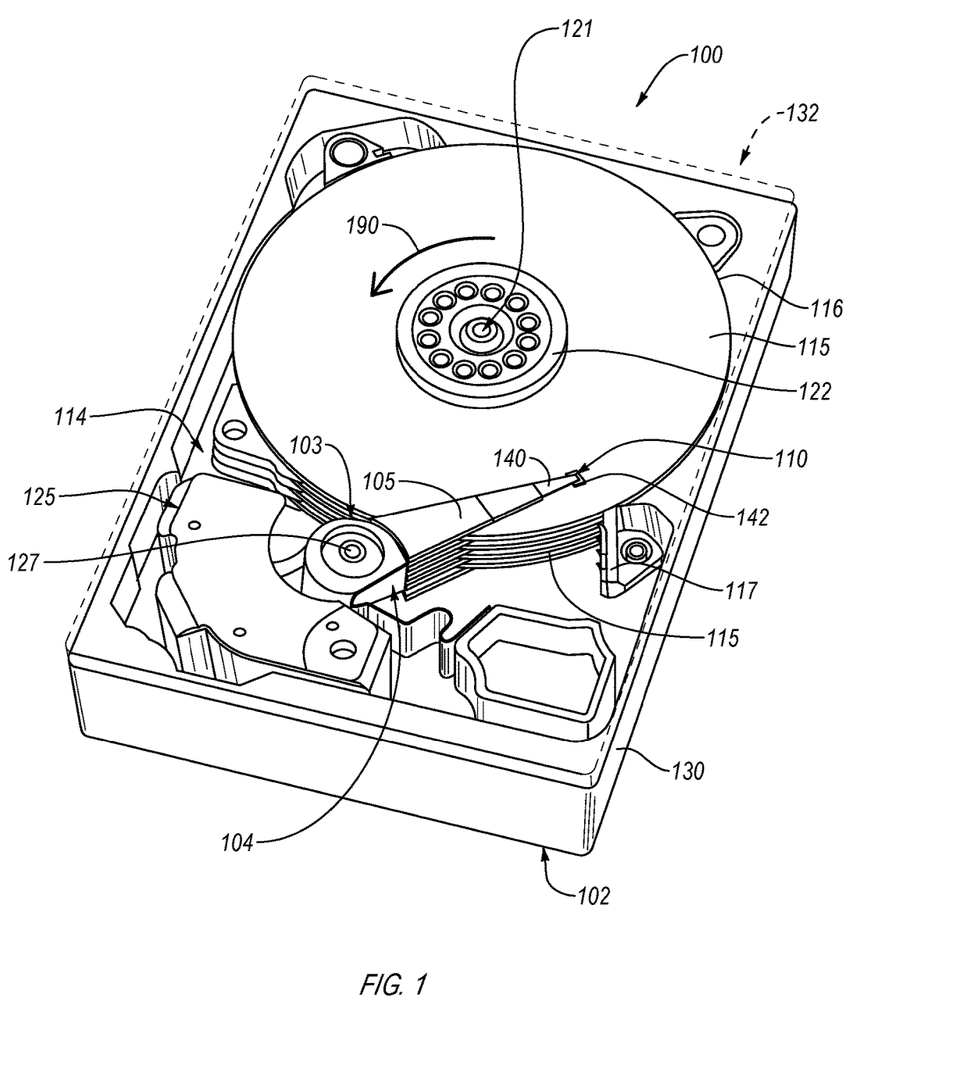
FIG. 1 is a perspective view of a magnetic storage device, according to one or more examples of the present disclosure.

Referring to FIG. 1, a magnetic storage device 100, according to one embodiment, is depicted as a hard disk drive (HDD). However, in other embodiments, the magnetic storage device 100 can be any of various magnetic storage devices without departing from the essence of the subject matter of the present disclosure. The magnetic storage device 100 includes a housing 102 that seals or encloses an interior cavity 114 defined within the housing. The housing 102 includes a base 130 and a cover 132 (shown in dashed lines so as not to obscure internal features of the magnetic storage device 100 within the interior cavity 114 of the housing 102). The cover 132 is coupled to the base 130 to enclose the interior cavity 114 from the environment exterior to the housing 102. In some implementations, a seal or gasket is positioned between the base 130 and the cover 132 to promote a seal between the base 130 and the cover 132.

Figure 2:
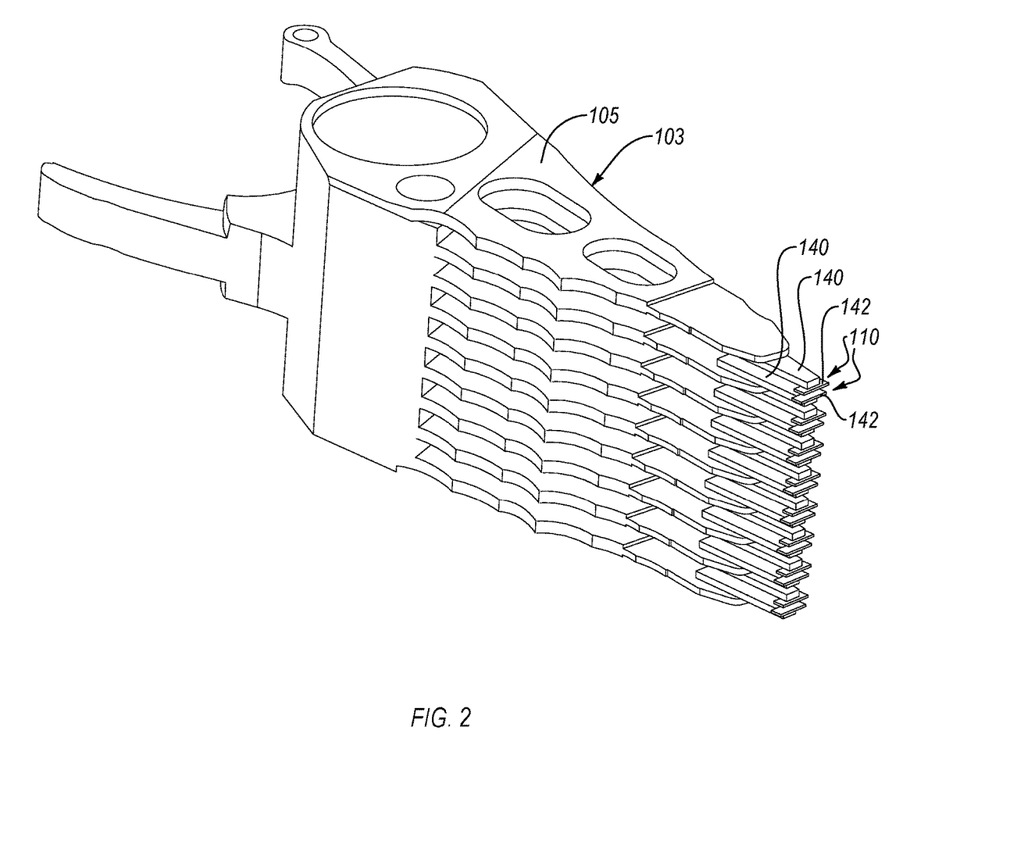
FIG. 2 is a perspective view of carriage arms, suspension arms, and sliders of a magnetic storage device, according to one or more examples of the present disclosure.

The magnetic storage device 100 includes various features located within the interior cavity 114 of the housing 102. In some embodiments, the magnetic storage device 100 includes a carriage 103, disks 115, a spindle motor 121, and a voice coil magnetic (VCM) actuator 125 within the interior cavity 114. The carriage 103 includes a plurality of carriage arms 105 and at least one read-write head assembly 110 coupled to the distal tip of each arm of the plurality of carriage arms 105. In the illustrated embodiment of FIG. 2, two read-write head assemblies 110 are coupled to the distal tip of each carriage arm of the plurality of carriage arms 105. Each read-write head assembly 110 includes a suspension arm 140, a slider 142, and at least one read-write head 148 (see, e.g., FIG. 3). Although not shown, each read-write head assembly 110 can include at least one gimbal. The gimbal movably couples the suspension arm 140, the slider 142, and the at least one read-write head 148 to a corresponding one of the carriage arms 105. Although the magnetic storage device 100 is shown to have five carriage arms 105 and four disks 115 in the embodiment of FIG. 1 and nine carriage arms 105 and eight disks 115 in the embodiment of FIG. 2, in other embodiments the magnetic storage device 100 can have fewer than five carriage arms 105, fewer than four disks 115, more than nine carriage arms 105, more than eight disks 115, between 6-8 carriage arms 105, or between 5-7 disks 115. Each side of each carriage arm 105 facing a disk 115 has a read-write head assembly 110 (e.g., in FIG. 2, each of bottom and top carriage arms 105 has one read-write head assembly 110 and each of middle carriage arms 105, between the bottom and top carriage arms 105, has two read-write head assemblies 110). Similarly, although the magnetic storage device 100 is shown to have one spindle motor 121 and one VCM actuator 125, in other embodiments, the magnetic storage device 100 can have any number of spindle motors 121 and VCM actuators 125.

The spindle motor 121 is coupled to the base 130. Generally, the spindle motor 121 includes a stationary portion non-movably fixed relative to the base 130 and a spindle that is rotatable relative to the stationary portion and the base 130. Accordingly, the spindle of the spindle motor 121 can be considered to be part of or integral with the spindle motor. Generally, the spindle motor 121 is operable to rotate the spindle relative to the base 130. The disks 115, or platters, are co-rotatably fixed to the spindle of the spindle motor 121 via respective hubs 122, which are co-rotatably secured to respective disks 115 and the spindle. As the spindle of the spindle motor 121 rotates, the disks 115 correspondingly rotate. In this manner, the spindle of the spindle motor 121 defines a rotational axis of each disk 115. The spindle motor 121 can be operatively controlled to rotate the disks 115, in a rotational direction 190, a controlled amount at a controlled rate.

Each of the disks 115 may be any of various types of magnetic recording media. Generally, in one embodiment, each disk 115 includes a substrate and a magnetic material applied directly or indirectly onto the substrate. For example, the magnetic material of the disks 115 may be conventional granular magnetic recording disks or wafers that have magnetic layer bits with multiple magnetic grains on each bit. In granular magnetic media, all of the bits are co-planar and the surface 116 of the disk is substantially smooth and continuous. In one embodiment, each bit has a magnetic dipole moment that can either have an in-plane (longitudinal) orientation or an out-of-plane (perpendicular) orientation.

As the disks 115 rotate in a read-write mode, the VCM actuator 125 electromagnetically engages voice coils of the carriage arms 105 to rotate the carriage arms 105, and the read-write head assemblies 110, which are coupled to the carriage arms 105, relative to the disks 115 in a rotational direction along a plane parallel to read-write surfaces 154 of the disks 115. The carriage arms 105 can be rotated to position the read-write head 148 of the read-write head assemblies 110 over a specified radial area of the read-write surface 154 of a corresponding disk 115 for read and/or write operations. The VCM actuator 125 is fixed to the base 130 in engagement with the voice coils of the carriage arms 105, which are rotatably coupled to the base 130 via a spindle 127 extending through the carriage 103. Generally, the spindle 127 defines a rotational axis about which the carriage arms 105 rotate when actuated by the VCM actuator 125.

The carriage arms 105 are non-movably fixed to and extend away from a base of the carriage 103 in a spaced-apart manner relative to each other. In some implementations, the carriage arms 105 are spaced an equi-distance apart from each other and extend parallel relative to each other. A respective one of the disks 115 is positioned between adjacent carriage arms 105. In an idle mode (e.g., when read-write operations are not being performed), the VCM actuator 125 is actuated to rotate the carriage arms 105, in a radially outward direction relative to the disks 115, such that the read-write head assemblies 110 are parked or unloaded onto a ramp support 117 secured to the base 130.

Each read-write head 148 includes at least one read transducer and at least one write transducer. The read transducer is configured to detect magnetic properties (e.g., magnetic bit patterns) of a disk 115 and convert the magnetic properties into an electrical signal. In contrast, the write transducer changes the magnetic properties of a disk 115 responsive to an electrical signal. For each read-write head assembly 110, the electrical signals are transmitted from and to the read-write head 148 via electrical traces or lines formed in or coupled to the slider 142, suspension arm 140, and carriage arm 105. The electrical traces of the slider 142, suspension arm 140, and carriage arm 105 are electrically interconnected to facilitate transmission of electrical signals between the read-write head 148 and a flex connector 104 of the magnetic storage device 100, which is in communication with a control module of the magnetic storage device 100. The control module is configured to process the electrical signals and facilitate communication of the electrical signals between the magnetic storage device 100 and one or more external computing devices. Generally, the control module includes software, firmware, and/or hardware used to control operation of the various components of the magnetic storage device 100. The control module may include a printed circuit board on or in which the hardware is mounted. As is described in more detail below, solder weldments are utilized to electrically connect corresponding electrical contact pads (and corresponding electrical traces) of the slider 142 and the suspension arm 140.

Although not shown, the read-write head assembly 110 also includes a head actuator selectively operable to move the read-write head 148 relative to the carriage arm 105. The head actuator selectively moves the read-write head 148 in any of various manners and in any of various directions. For example, the head actuator can be configured to move the read-write head 148 linearly in any of various directions, such as in one or more of a first sideways direction, a second sideways direction, a forward direction, and a backward direction, along a plane parallel to the read-write surface 154 of the disk 115. As another example, the head actuator may be, alternatively or additionally, configured to move the read-write head 148 linearly in any of various directions, such as an upward direction and a downward direction, along a plane perpendicular to the read-write surface 154 of the disk 115. Further, in some implementations, the head actuator may be, alternatively or additionally, configured to move the read-write head 148 rotationally in any of various rotational directions along planes parallel to and/or perpendicular to the read-write surface 154 of the disk 115. The head actuator can be any of various actuators known in the art, such as, for example, so-called electrically-controlled micro-actuators and milli-actuators (e.g., piezo-electric actuators).

The suspension arm 140 of the read-write head assembly 110 is softer and more flexible than the carriage arm 105 to promote resilient support the slider 142 relative to the carriage arm 105. For example, in some implementations, the suspension arm 140 is flexible to flex away from the read-write surface 154 of the disk 115 to allow the slider 142 move away from the read-write surface 154 of the disk 115, such as when an air bearing is formed between the read-write surface 154 and the slider 142 as the disk 115 spins relative to the read-write head assembly 110. The suspension arm 140 can have a generally thin, sheet-like, construction and taper from carriage arm 105 to the slider 142. The slider 142 is coupled to a distal end portion of the suspension arm 140 such that the suspension arm 140 is positioned between or separates the slider 142 from the carriage arm 105. In this manner, the slider 142 is distally spaced apart from the carriage arm 105 via the suspension arm 140. The suspension arm 140 is either directly or indirectly coupled to the carriage arm 105. The suspension arm 140 can be made of any of various materials, such as metals, composites, plastics, and the like.

According to some embodiments, the suspension arm 140 is directly coupled to the carriage arm 105. In such embodiments, the suspension arm 140 is non-movably fixed to the carriage arm 105. In other words, although the suspension arm 140 may flex to move portions of the suspension arm 140 relative to the carriage arm 105, the portion of the suspension arm 140 immediately affixed to the carriage arm 105 does not move relative to the carriage arm 105. The suspension arm 140 can be non-movably fixed to the carriage arm 105 via any of various coupling techniques, such as fastening, bonding, adhering, welding, and the like.

In contrast, in certain embodiments, the suspension arm 140 is indirectly coupled to the carriage arm 105. In such embodiments, the suspension arm 140 can be non-movably fixed to carriage arm 105 or movably fixed to the carriage arm 105. According to some implementations, the suspension arm 140 is movably fixed to the carriage arm 105 via a suspension arm actuator (not shown). The suspension arm actuator movably couples a proximal end of the suspension arm 140, and thus the entire suspension arm 140, to the distal end of the carriage arm 105. The suspension arm actuator is configured to selectively move the suspension arm 140 relative to the carriage arm 105. More specifically, as an example, the suspension arm actuator selectively rotates the suspension arm 140, and thus the slider 142 relative to the carriage arm 105, in rotational directions along a plane parallel to the read-write surface 154 of the disk 115. The suspension arm actuator can be any of various actuators known in the art, such as, for example, so-called electrically-controlled micro-actuators and milli-actuators.

Figure 3:
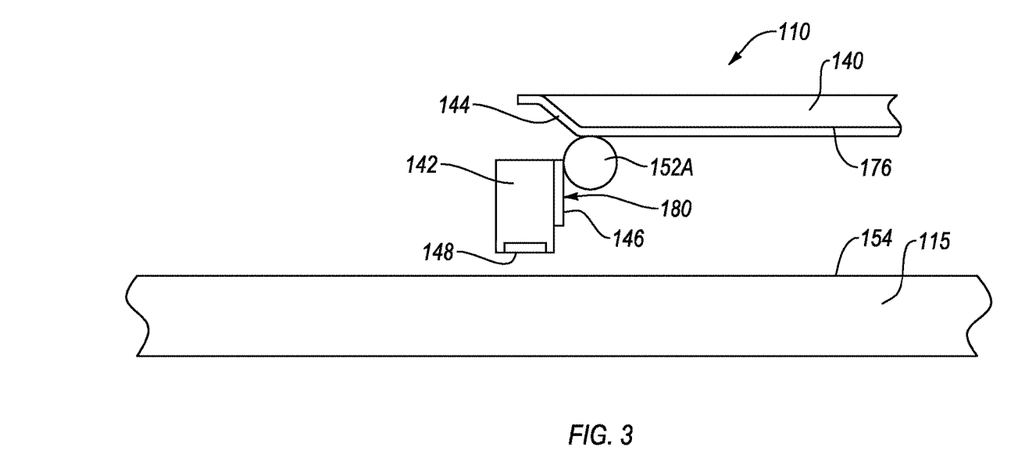
FIG. 3 is a side elevation view of a read-write head assembly of a magnetic storage device, according to one or more examples of the present disclosure.
Figure 4:
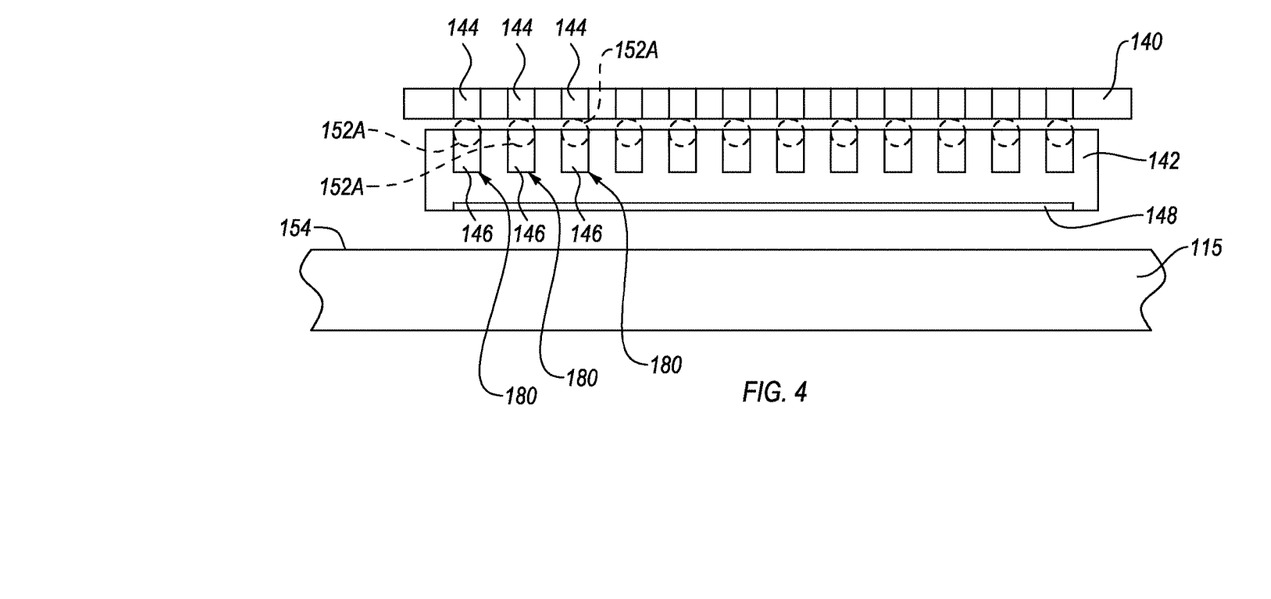
FIG. 4 is a front elevation view of a read-write head assembly of a magnetic storage device, according to one or more examples of the present disclosure.

Referring to FIGS. 3 and 4, the suspension arm 140 includes a slider attachment side 176 facing the read-write surface 154 of the disk 115. The suspension arm 140 may thin towards its distal end and converge to a point in some implementations such that at the distal end of the suspension arm 140 the slider attachment side 176 is angled relative to, but still faces, the read-write surface 154 of the disk 115.

Additionally, the suspension arm 140 includes at least one first electrical contact pad 144 on the slider attachment side 176. The first electrical pad 144 is located at the distal end of the suspension arm 140 and may extend along the length of the suspension arm 140 in a direction parallel with the read-write surface 154. Alternatively, the length of the first electrical pad 144 can be shorter with a narrower electrical trace electrically coupled to the first electrical pad 144 extending along the length of the suspension arm 140. As shown in FIG. 4, the suspension arm 140 includes a plurality of first electrical contact pads 144 spaced apart from each other in a direction parallel with the read-write surface 154. In one implementation, the suspension arm 140 includes at least twelve first electrical contact pads 144 spaced apart from each other. In another implementation, the suspension arm 140 includes at least fourteen first electrical contact pads 144 spaced apart from each other. The first electrical contact pad 144 can be made of any of various electrically conductive materials, such as gold, silver, copper, and the like. Moreover, the first electrical contact pad 144 can be attached to or applied onto the slider attachment side 176 of the suspension arm 140 using any of various techniques, such as adhering, bonding, printing, sputtering, and the like.

The slider 142 of the read-write head assembly 110 is configured to support the read-write head 148 at a proper flying height above the read-write surface 154. The read-write head 148 is embedded in the slider 142. Although not shown, the slider 142 may include side rails that glide along the read-write surface 154 as the disk 115 rotates relative to the read-write head assembly 110. Alternatively, the slider 142 may include complex shapes, such as a Femto slider, configured to predictably position the slider 142 above the read-write surface 154 of the disk 115. The slider 142 can be made of any of various materials, such as low friction materials. For example, in one implementation, the slider 142 is at least partially made of alumina. According to an implementation, the slider 142 is made of AlTiC and alumina, with the read/write head being embedded in the alumina. The alumina can be applied onto the AlTiC via a spattering technique in some implementations.

Figure 5:
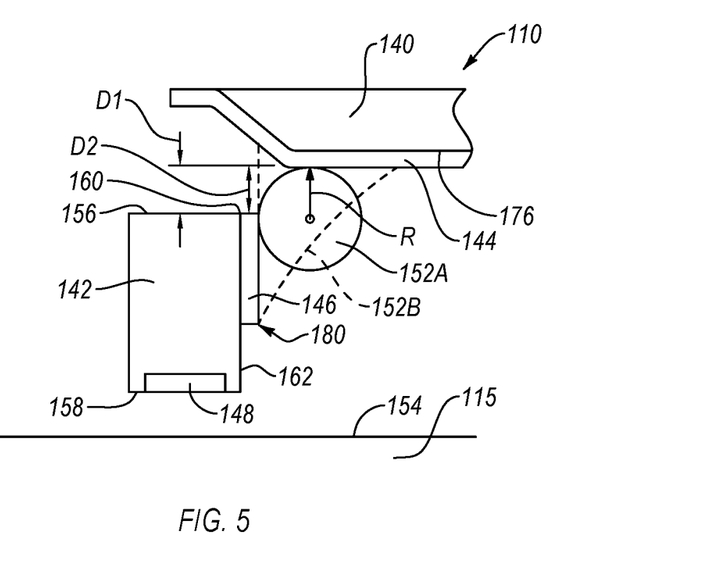
FIG. 5 is a side elevation view of a read-write head assembly of a magnetic storage device, according to one or more examples of the present disclosure.

Referring to FIG. 5, according to one embodiment, the slider 142 includes a suspension attachment side 162 that faces toward the carriage arm 105. In one implementation, the suspension attachment side 162 has a planar surface that is perpendicular to the read-write surface 154 of the disk 115. In some examples, such as shown in FIG. 5, an entirety of the suspension attachment side 162 is a planar surface that is perpendicular to the read-write surface 154. Alternatively, in other examples, the suspension attachment side 162 includes surface features, such as a bevel feature 166 (see, e.g., FIG. 9) or a step feature 168 (see, e.g., FIG. 10) such that some portions of the suspension attachment side 162 define surfaces that are angled more than 90-degrees relative to the read-write surface 154, such as with the bevel feature 166, or are parallel to the read-write surface 154, such as with the step feature 168.

The suspension attachment side 162 extends up to a non-head side 156 of the slider 142. The non-head side 156 of the slider 142 is a side of the slider 142 that does not include the read-write head 148 and faces the suspension arm 140 (e.g., faces away from the read-write surface 154). As additionally defined, the non-head side 156 of the slider 142 is the side of the slider 142 furthest away from the read-write surface 154 of the corresponding disk 115. In one implementation, the non-head side 156 of the slider 142 is generally parallel with the read-write surface 154. The slider 142 further includes a first slider edge 160 (or corner) defined at the intersection of the suspension attachment side 162 and the non-head side 156 of the slider 142. In other words, the first slider edge 160 separates the suspension attachment side 162 from the non-head side 156. In some implementations, the first slider edge 160 is the edge of the slider 142 furthest away from the read-write surface 154 of the corresponding disk 115. Accordingly, even when features of the suspension attachment side 162, such as the bevel feature 166 and the step feature 168, define intermediate edges between the non-head side 156 and a head side 158 of the slider 142, such edges are not first slider edges.

The head side 158 of the slider 142 is a side of the slider 142 that includes or directly supports the read-write head 148 and faces away from the suspension arm 140 (e.g., faces toward the read-write surface 154). As additionally defined, the head side 158 of the slider 142 is the side of the slider 142 closest to the read-write surface 154 of the corresponding disk 115. In one implementation, the head side 158 of the slider 142 is generally parallel with the read-write surface 154.

The slider 142 further includes at least one electrical contact component 180 on the suspension attachment side 162 up to the first slider edge 160. In other words, while the at least one electrical contact component 180 may not cover an entire height of the suspension attachment side 162, the electrical contact component 180 at least covers a portion of the suspension attachment side 162 up to the first slider edge 160. In this manner, a minimum distance D1 between the first electrical contact pad 144 of the suspension arm 140 and the non-head side 156 of the slider 142 is substantially equal to or more than a minimum distance D2 between the first electrical contact pad 144 of the suspension arm 140 and the first electrical contact component 180. In other words, there is no gap (in a direction perpendicular to the read-write surface 154) along the suspension attachment side 162 between the first electrical contact component 180 and the non-head side 156 of the slider 142. Because this gap is zero, solder is effectively constrained from directly contacting the non-electrical contact portions of the slider 142 and thus solder-induced open conditions are reduced.

As shown in FIG. 4, the slider 142 includes a plurality of electrical contact components 180 spaced apart from each other in a direction parallel with the read-write surface 154. In one implementation, the slider 142 includes at least twelve electrical contact components 180 spaced apart from each other. In another implementation, the slider 142 includes at least fourteen electrical contact components 180 spaced apart from each other.

Referring to FIGS. 3-7, in one embodiment, the electrical contact component 180 only includes a second electrical contact pad 146. Therefore, the second electrical contact pad 146 covers the suspension attachment side 162 up to the first slider edge 160. In this manner, a minimum distance D1 between the first electrical contact pad 144 of the suspension arm 140 and the non-head side 156 of the slider 142 is substantially equal to or more than a minimum distance D2 between the first electrical contact pad 144 of the suspension arm 140 and the second electrical contact pad 146. In other words, there is no gap (in a direction perpendicular to the read-write surface 154) along the suspension attachment side 162 between the second electrical contact pad 146 and the non-head side 156 of the slider 142. Several examples of a process for forming the second electrical contact pad 146 up to the first slider edge 160 are described below.

The second electrical contact pad 146 can be made of any of various electrically conductive materials, such as gold, silver, copper, and the like. Moreover, the second electrical contact pad 146 can be attached to or applied onto the suspension attachment side 162 of the slider 142 using any of various techniques, such as adhering, bonding, printing, sputtering, and the like.

Figure 8:
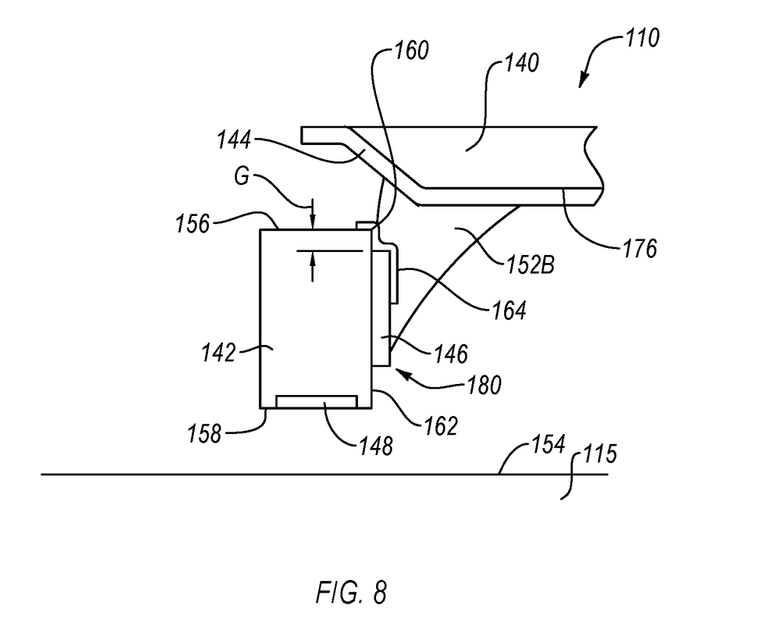
FIG. 8 is a side elevation view of a read-write head assembly of a magnetic storage device, according to one or more examples of the present disclosure.
Figure 9:
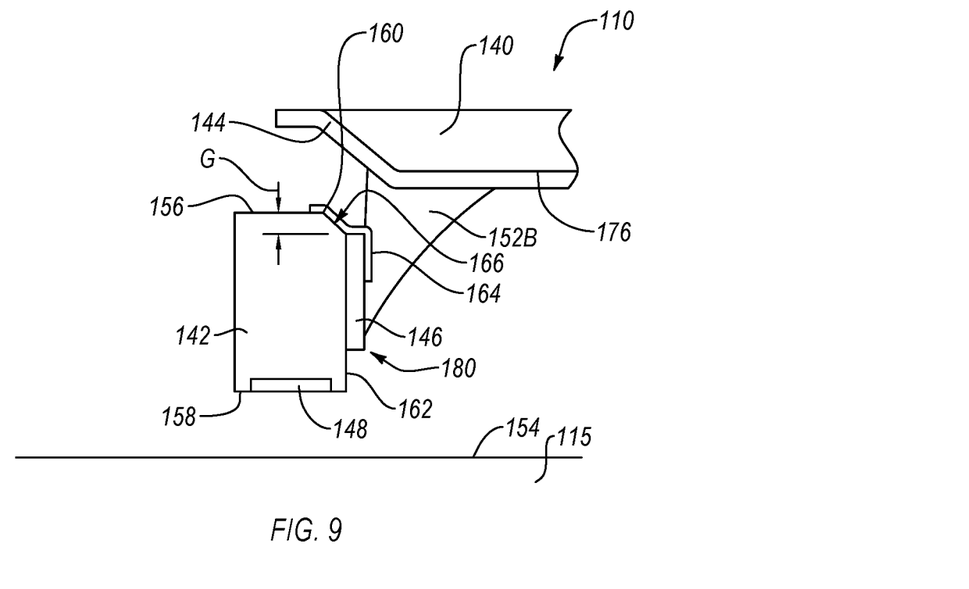
FIG. 9 is a side elevation view of a read-write head assembly of a magnetic storage device, according to one or more examples of the present disclosure.
Figure 10:
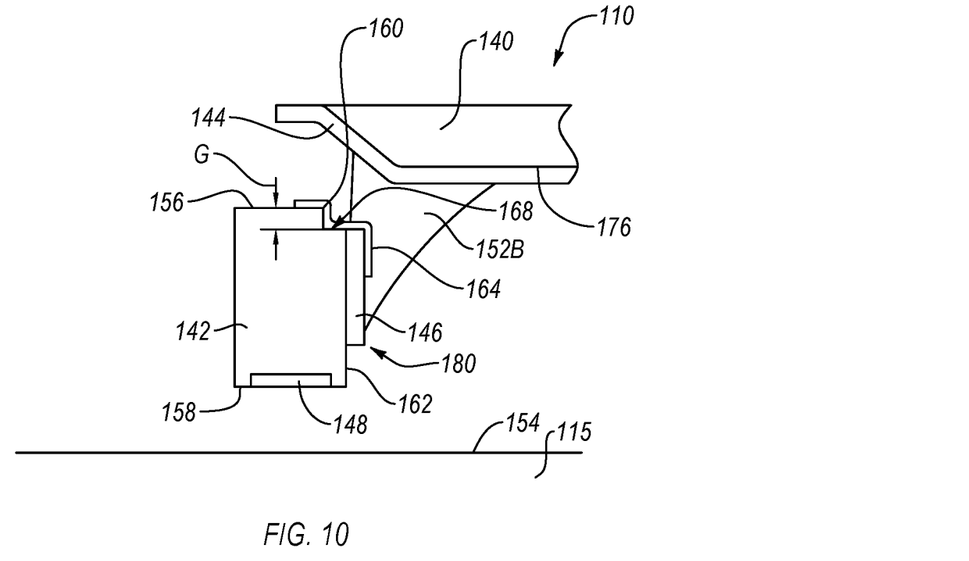
FIG. 10 is a side elevation view of a read-write head assembly of a magnetic storage device, according to one or more examples of the present disclosure.
Figure 11:
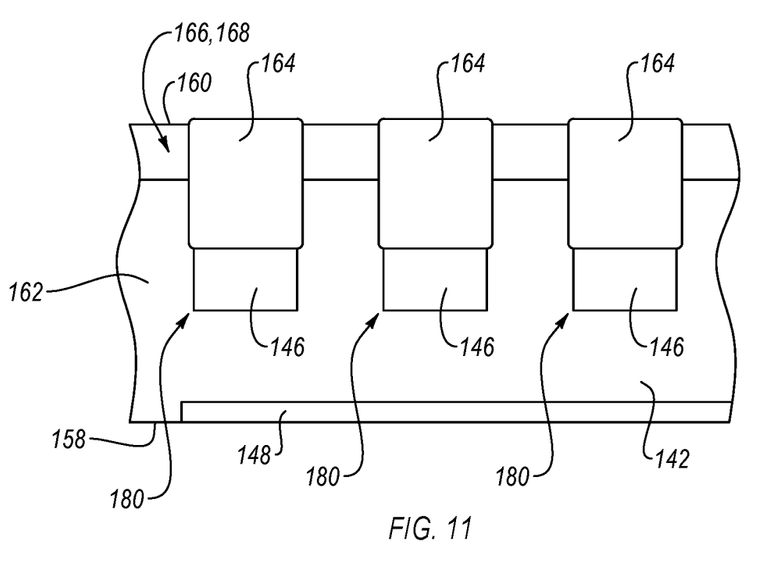
FIG. 11 is a front elevation view of a read-write head assembly of a magnetic storage device, according to one or more examples of the present disclosure.

Referring to FIGS. 8-10, in one embodiment, the electrical contact component 180 includes both the second electrical contact pad 146 and a metallic sheet 164. Generally, the second electrical contact pad 146 does not cover the suspension attachment side 162 of the slider 142 up to the first slider edge 160 and the metallic sheet 164 covers the portion of suspension attachment side 162 up to the first slider edge 160 that is not covered by the second electrical contact pad 146. In other words, the metallic sheet 164 is interposed within and covers the suspension attachment side 162 along a gap G between the second electrical contact pad 146 and the first slider edge 160. In this manner, the combination of the second electrical contact pad 146 and the metallic sheet 164 covers the suspension attachment side 162 of the slider 142 up to the first slider edge 160. Such a configuration can be particularly beneficial where extending the second electrical contact pad 146 along the suspension attachment side 162 up to the first slider edge 160 may be difficult or impractical, such as, for example, when the suspension attachment side 162 has surface features and the metallic sheet 164 overlays the surface features. Additionally, the metallic sheet 164 at least partially overlays the second electrical contact pad 146.

The metallic sheet 164 is configured to overlay the second electrical contact pad 146 and the suspension attachment side 162 up to the first slider edge 160 in some embodiments. In certain implementations, the metallic sheet 164 terminates at the first slider edge 160. However, in other implementations, such as shown, the metallic sheet 164 wraps around the first slider edge 160 and overlays at least a portion of the non-head side 156 of the slider 142, which can further promote prevention of solder from getting into contact with the body of the slider 142.

The metallic sheet 164 is thinner and more pliable than the second electrical contact pad 146, which makes it more conducive to conforming to surface features on the suspension attachment side 162 and/or trimming at the first slider edge 160. In one implementation, the metallic sheet 164 is made of a metallic material with an ionization energy less than that of the body of the slider 142, such as at most 9,500 eV. For example, the metallic sheet 164 can be made of gold. According to an example, a thickness of the metallic sheet 164 is less than or equal to 5 μm. The metallic sheet 164 can be applied onto the second electrical contact pad 146 via a spattering technique in some implementations.

Electrical connectivity between the first electrical contact pad 144 of the suspension arm 140 and the corresponding second electrical contact pad 146 of the slider 142 is provided by a discrete solder weldment. Accordingly, the read-write assembly 110 includes a quantity of solder weldments equal to the quantity of first electrical contact pads 144 and the quantity of electrical contact components 180. In one implementation, the read-write assembly 110 includes at least twelve solder weldments. According to another implementation, the read-write assembly 110 includes at least fourteen solder weldments.

The solder weldment is made of any of various soldering materials. Moreover, the solder weldment can take the form of a solder ball 152A or a solder fillet 152B. In the case of a solder ball 152A, a radius R of the solder ball 152A is more than the distance D2 between the first electrical contact pad 144 of the suspension arm 140 and the electrical contact component 180. In this manner, solder from the solder ball 152A is less likely to make contact with the body of the slider 142 to cause an open connection. In one example, the radius R of the solder ball is equal to or less than about 40 μm.

Figure 13:
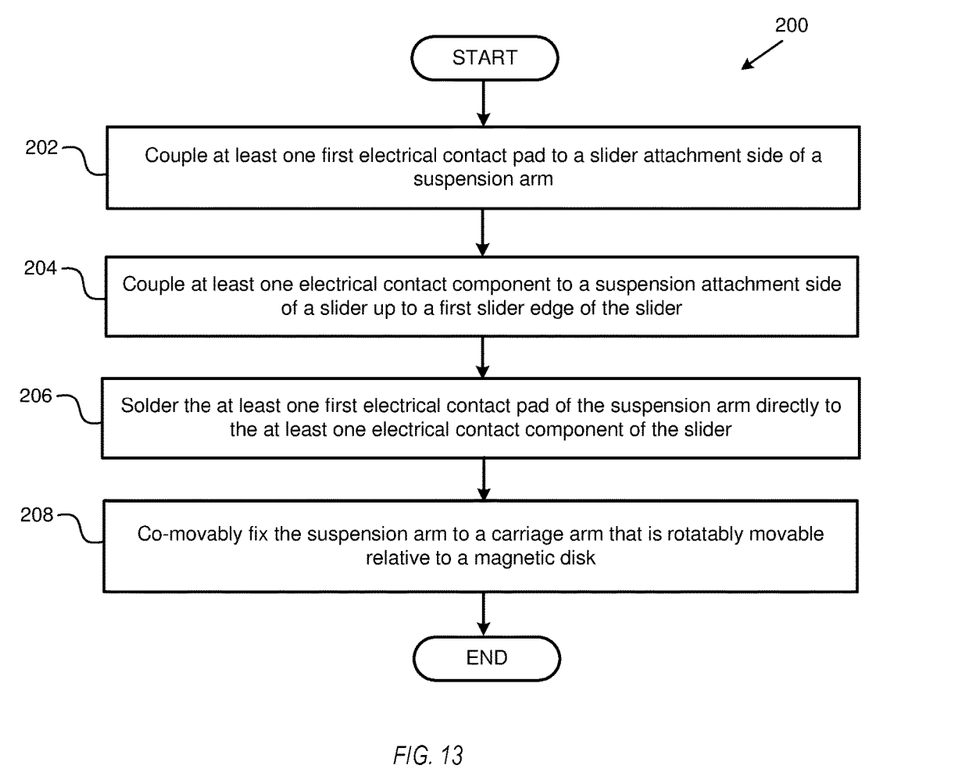
FIG. 13 is a schematic flow chart of a method of making a magnetic storage device, according to one or more examples of the present disclosure.

Referring to FIG. 13, according to one embodiment, a method 200 of making a magnetic storage device, such as magnetic storage device 100, includes coupling at least one first electrical contact pad 144 to a slider attachment side 176 of a suspension arm 140 at 202. The method 200 also includes coupling at least one electrical contact component 180 to a suspension attachment side 162 of a slider 142 up to a first slider edge 160 of the slider at 204. The first slider edge 160 is an intersection of the suspension attachment side 162 and a non-head side 156 of the slider 142 facing the suspension arm 140. The method 200 further includes soldering the at least one first electrical contact pad 144 of the suspension arm directly to the at least one electrical contact component 180 of the slider 142 at 206. The method 200 additionally includes co-movably fixing the suspension arm 140 to a carriage arm 105 that is rotatably movable relative to a magnetic disk 115 at 208.

Figure 12:
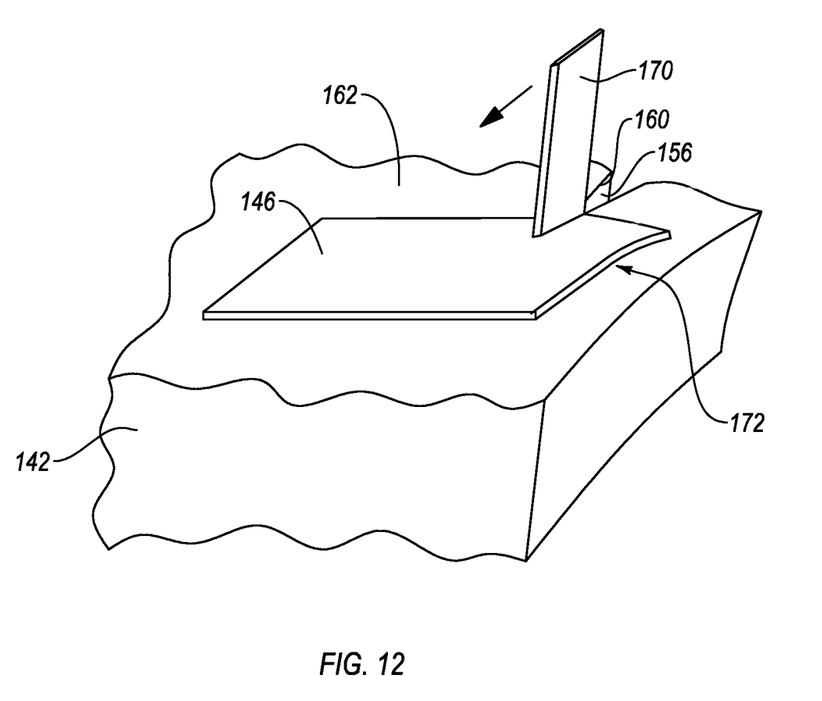
FIG. 12 is a perspective view of a slider of a read-write head assembly of a magnetic storage device being processed, according to one or more examples of the present disclosure.

According to one implementation of the method 200, the at least one electrical contact component 180 comprises a second electrical contact pad 146. Referring to FIG. 12, coupling the at least one electrical contact component at 204 may include applying a strip of electrical material 172 onto the suspension attachment side 162 of the slider 142 such that the strip of electrical material 172 overhangs the first slider edge 160. Coupling the at least one electrical contact component at 204 may further include trimming the strip of electrical material 172 along the first slider edge 160, such as along a cut path coextensive with the first slider edge 160, using a cutting tool 170 to form the second electrical contact pad 146. The cutting tool 170 can be any of various cutting tools, such as a blade, scissors, laser-cutter, and the like.

Figure 6:
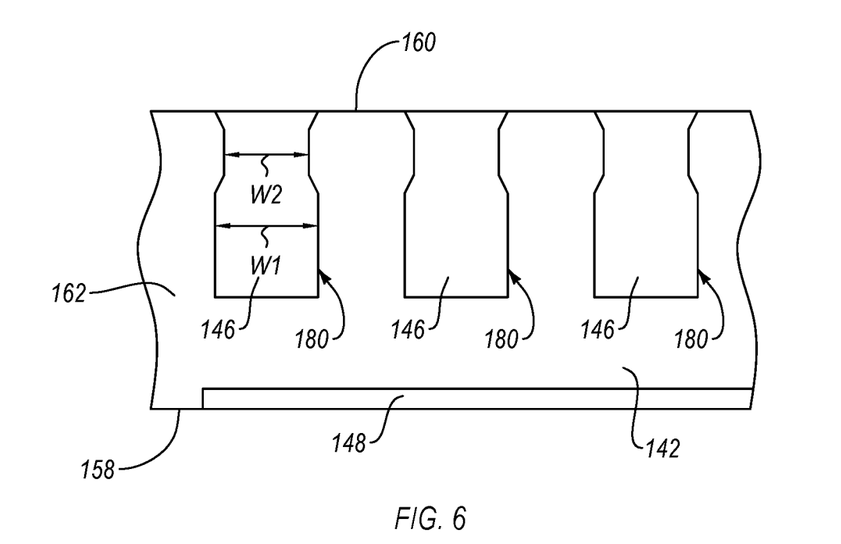
FIG. 6 is a front elevation view of a read-write head assembly of a magnetic storage device, according to one or more examples of the present disclosure.
Figure 7:
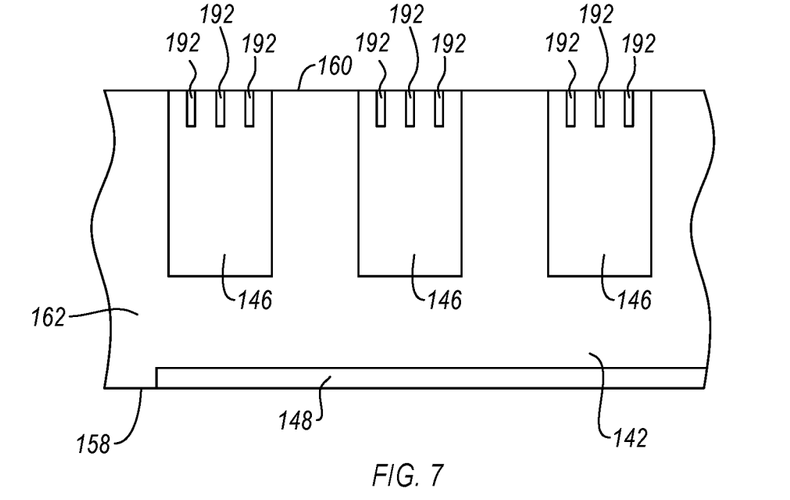
FIG. 7 is a front elevation view of a read-write head assembly of a magnetic storage device, according to one or more examples of the present disclosure.

In some implementations, trimming the strip of electrical material 172 along the first slider edge 160 may cause deformation of the second electrical contact pad 146 along the trimmed edge. The deformation may effectively narrow the gap between adjacent second electrical contact pads 146, which increases the likelihood of adjacent second electrical contact pads 146 coming into contact and causing an electrical short. Accordingly, in certain implementations, prior to trimming the strip of electrical material 172, coupling the at least one electrical contact component 180 may further include forming the strip of electrical material 172 to have a narrower width at the first slider edge 160 than away from the first slider edge 160. For example, as shown in FIG. 6, a width W2 nearer the first slider edge 160 is less than a width W1 away from the first slider edge 160. Such a configuration helps prevent electrical contact between adjacent second electrical contact pads 146 by increasing the distance between adjacent second electrical contact pads 146, thus anticipating and allowing for some lateral deformation (e.g., expansion) of the second electrical contact pad 146 along the trimmed edge as shown in FIG. 6 during the trimming step.

In some implementations, trimming the strip of electrical material 172 along the first slider edge 160 may cause burrs to form along the trimmed edge of the electrical material 172. Burrs tend to reduce the reliability of the electrical connection between the first electrical contact pad 144 and the second electrical contact pad 146 and may cause an open connection. Therefore, in certain implementations, the formation of burrs is reduced by forming one or more slits 192 in the strip of electrical material 172, from the first slider edge 160 along the suspension attachment side 162 of the slider 142, prior to trimming the strip of electrical material 172. The slits 192 extend along only a portion, such as less than 10%, of the height of the second electrical contact pads 146. According certain implementations, the method 200 may include, prior to trimming the strip of electrical material 172, both forming the strip of electrical material 172 to have a narrower width at the first slider edge 160 than away from the first slider edge 160 and forming one or more slits 192 in the strip of electrical material 172 from the first slider edge 160 along the suspension attachment side 162 of the slider 142.

According to some implementations of the method 200, coupling the at least one electrical contact component 180 at 204 includes attaching a second electrical contact pad 146 to the suspension attachment side 162 of the slider 142 such that a gap G exists between the second electrical contact pad 146 and the first slider edge 160 and overlaying the second electrical contact pad 146 and the gap G between the second electrical contact pad 146 and the first slider edge 160 with a metallic sheet 164.

In the above description, certain terms may be used such as "up," "down," "upper," "lower," "horizontal," "vertical," "left," "right," "over," "under" and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object. Further, the terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise. Further, the term "plurality" can be defined as "at least two."

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other, but having one or more additional elements between the coupled elements. Further, as used herein, securing one element to another element can include direct securing and indirect securing. Additionally, as used herein, "adjacent" does not necessarily denote contact. For example, one element can be adjacent another element without being in contact with that element.

As used herein, the phrase "at least one of", when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required. For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Some of the functional units described in this specification have been labeled as modules, in order to more particularly emphasize their implementation independence. For example, a module may be implemented as a hardware circuit comprising custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of computer readable program code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of computer readable program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the computer readable program code may be stored and/or propagated on in one or more computer readable medium(s).

The computer readable medium may be a tangible computer readable storage medium storing the computer readable program code. The computer readable storage medium may be, for example, but not limited to, an electronic, magnetic, optical, electromagnetic, infrared, holographic, micromechanical, or semiconductor system, apparatus, or device, or any suitable combination of the foregoing.

More specific examples of the computer readable medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. In the context of this document, a computer readable storage medium may be any tangible medium that can contain, and/or store computer readable program code for use by and/or in connection with an instruction execution system, apparatus, or device.

The computer readable medium may also be a computer readable signal medium. A computer readable signal medium may include a propagated data signal with computer readable program code embodied therein, for example, in baseband or as part of a carrier wave. Such a propagated signal may take any of a variety of forms, including, but not limited to, electrical, electro-magnetic, magnetic, optical, or any suitable combination thereof. A computer readable signal medium may be any computer readable medium that is not a computer readable storage medium and that can communicate, propagate, or transport computer readable program code for use by or in connection with an instruction execution system, apparatus, or device. Computer readable program code embodied on a computer readable signal medium may be transmitted using any appropriate medium, including but not limited to wireless, wireline, optical fiber cable, Radio Frequency (RF), or the like, or any suitable combination of the foregoing.

In one embodiment, the computer readable medium may comprise a combination of one or more computer readable storage mediums and one or more computer readable signal mediums. For example, computer readable program code may be both propagated as an electro-magnetic signal through a fiber optic cable for execution by a processor and stored on RAM storage device for execution by the processor.

Computer readable program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The computer readable program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present subject matter may be embodied in other specific forms without departing from its spirit or essential characteristics. The described embodiments are to be considered in all respects only as illustrative and not restrictive. All changes which come within the meaning and range of equivalency of the claims are to be embraced within their scope.

What is claimed is:

1. A magnetic storage device, comprising:
   a magnetic disk;
   a carriage arm rotatably movable relative to the magnetic disk;
   a suspension arm co-movably fixed to the carriage arm, wherein the suspension arm comprises:
      a slider attachment side; and
      at least one first electrical contact pad on the slider attachment side;
   a slider co-movably fixed to the suspension arm, wherein the slider comprises:
      a suspension attachment side;
      a non-head side facing the suspension arm and intersecting the suspension attachment side at a first slider edge of the slider;
      a head side facing away from the suspension arm; and
      at least one electrical contact component on the suspension attachment side up to the first slider edge, wherein the at least one electrical contact component comprises a first region, a second region, and a deformation region, and wherein the first region is narrower and nearer to the first slider edge than the second region and the deformation region is formed by lateral deformation of the first region along the first slider edge;
   at least one solder weldment directly coupled to the at least one first electrical contact pad and the at least one electrical contact component; and
   a read-write head coupled to the head side of the slider.

2. The magnetic storage device according to claim 1, wherein:
   the slider attachment side of the suspension arm, the non-head side of the slider, and the head side of the slider are parallel to the magnetic disk; and
   the suspension attachment side of the slider is perpendicular to the magnetic disk.

3. The magnetic storage device according to claim 1, wherein:
   the at least one electrical contact component comprises a second electrical contact pad; and
   the second electrical contact pad extends up to the first slider edge such that no gap exists between the second electrical contact pad and the first slider edge.

4. The magnetic storage device according to claim 1, wherein:
   the suspension arm comprises at least twelve first electrical pads;
   the slider comprises at least twelve electrical contact components; and
   the magnetic storage device comprises at least twelve weldments each directly coupled to corresponding ones of the at least twelve first electrical pads and the at least twelve electrical contact components.

5. A read-write head assembly for a magnetic storage device, comprising:
- a suspension arm, comprising:
  - a slider attachment side; and
  - at least one first electrical contact pad on the slider attachment side;
- a slider co-movably fixed to the suspension arm, wherein the slider comprises:
  - a suspension attachment side;
  - a non-head side facing the suspension arm and intersecting the suspension attachment side at a first slider edge of the slider;
  - a head side facing away from the suspension arm; and
  - at least one electrical contact component on the suspension attachment side up to the first slider edge, wherein the at least one electrical contact component comprises a first region and a second region, and wherein the first region is narrower and nearer to the first slider edge than the second region;
- at least one solder weldment directly coupled to the at least one first electrical contact pad and the at least one electrical contact component, the at least one solder weldment extending into at least a quarter of the second region; and
- a read-write head coupled to the head side of the slider.

6. The read-write head assembly according to claim 5, wherein:
- the at least one electrical contact component comprises a second electrical contact pad; and
- the second electrical contact pad extends up to the first slider edge such that no gap exists between the second electrical contact pad and the first slider edge.

7. A method of making a magnetic storage device, the method comprising:
- coupling at least one first electrical contact pad to a slider attachment side of a suspension arm;
- coupling at least one electrical contact component to a suspension attachment side of a slider up to a first slider edge of the slider, the first slider edge being an intersection of the suspension attachment side and a non-head side of the slider facing the suspension arm, wherein the at least one electrical contact component comprises a first region, a second region, and a deformation region, and wherein the first region is narrower and nearer to the first slider edge than the second region and the deformation region is formed by lateral deformation of the first region along the first slider edge;
- soldering the at least one first electrical contact pad of the suspension arm directly to the at least one electrical contact component of the slider; and
- co-movably fixing the suspension arm to a carriage arm that is rotatably movable relative to a magnetic disk.

8. The method according to claim 7, wherein:
- the at least one electrical contact component comprises a second electrical contact pad; and
- coupling the at least one electrical contact component comprises applying a strip of electrical material onto the suspension attachment side of the slider such that the strip of electrical material overhangs the first slider edge, trimming the strip of electrical material along the first slider edge, and, prior to trimming the strip of electrical material, forming the strip of electrical material to have a narrower width at the first slider edge than away from the first slider edge.

* * * * *